United States Patent [19]

Hampejs et al.

[11] Patent Number: 4,790,234
[45] Date of Patent: Dec. 13, 1988

[54] FLUIDIC POWER-ASSISTED SETTING DEVICE

[75] Inventors: Karel Hampejs; Stefan Gabriel, both of Neuhausen am Rheinfall, Switzerland

[73] Assignee: Sig Schweizerische Industrie-Gesellschaft, Neuhausen am Rheinfall, Switzerland

[21] Appl. No.: 931,125
[22] Filed: Nov. 17, 1986
[30] Foreign Application Priority Data Nov. 29, 1985 [CH] Switzerland .................. 5109/85

[51] Int. Cl.$^4$ ............................... F15B 13/16
[52] U.S. Cl. .......................... 91/362; 91/366; 91/458; 91/380; 91/381; 92/17
[58] Field of Search .............. 91/362, 366, 458, 380, 91/381; 92/17

[56] References Cited

U.S. PATENT DOCUMENTS 2,392,889  1/1946  Tear ...................................... 91/381

FOREIGN PATENT DOCUMENTS 389980  11/1941  Italy ...................................... 91/380
160976   6/1933  Switzerland .......................... 91/366
2025294  1/1980  United Kingdom ................. 91/380

Primary Examiner—Robert E. Garrett
Assistant Examiner—Thomas Denion
Attorney, Agent, or Firm—Spencer & Frank

[57] ABSTRACT

A fluidic power-assisted setting device has a setting motor having an output torque; a threaded spindle supported for rotation; a spindle nut threadedly mounted on the spindle for linear displacement; a setting member attached to the spindle nut for linear travel therewith; a gearing for transmitting the output torque of the setting motor to the spindle; a signalling device coupled to the gearing for generating an output signal when the linear force derived from the output torque of the setting motor is insufficient to overcome an external force opposing linear displacement of the setting member; and a fluidic power device including a hydraulic motor connected to the setting member for applying thereto a linear force to overcome the external force; and a hydraulic control valve hydraulically connecting the hydraulic motor with pressurized hydraulic fluid as a function of the output signal of the signalling device for causing the hydraulic motor to generate a force applied to the setting member for overcoming the external force opposing the setting member.

8 Claims, 1 Drawing Sheet

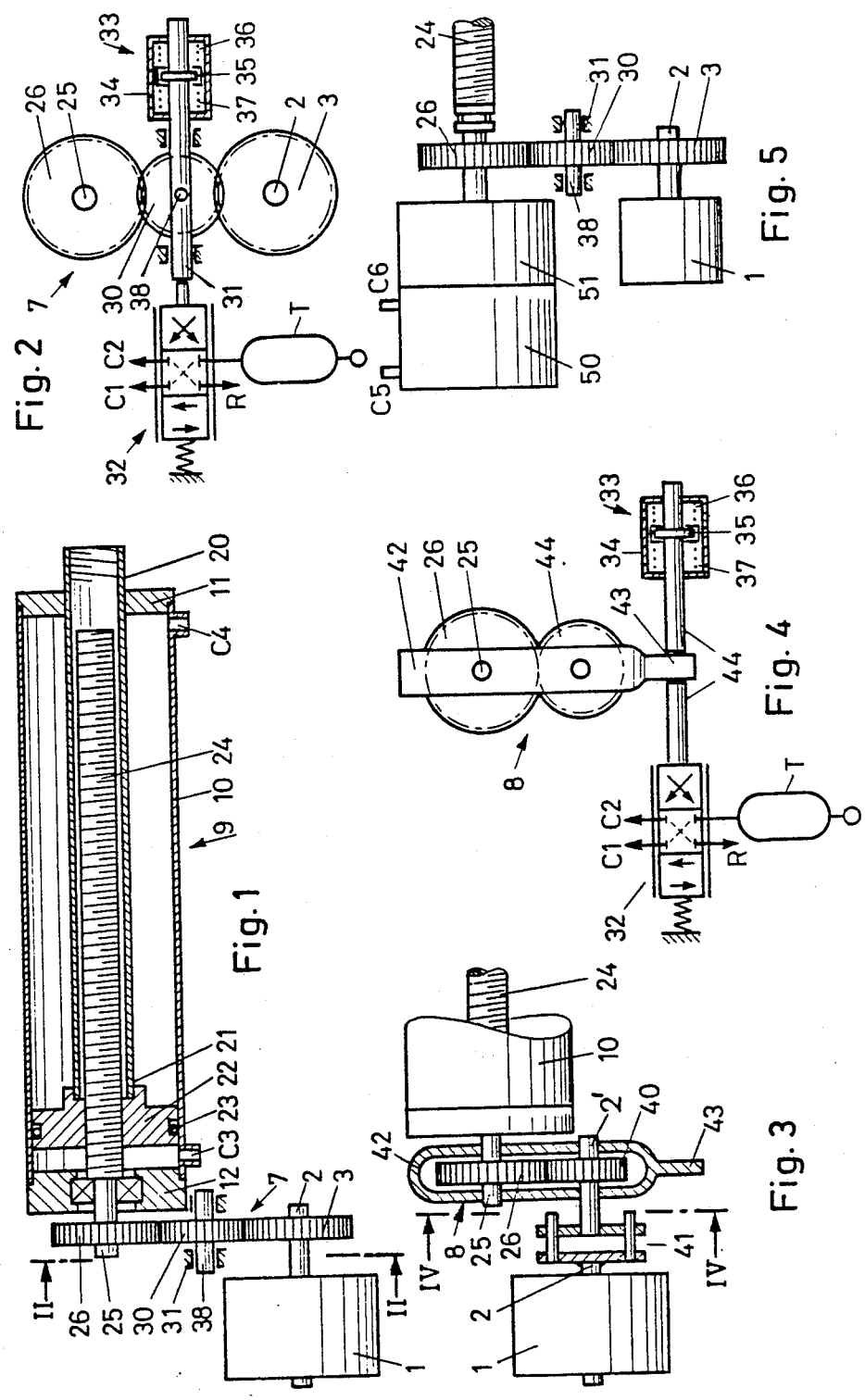

FLUIDIC POWER-ASSISTED SETTING DEVICE

BACKGROUND OF THE INVENTION

This invention relates to a fluidic power amplifier to amplify a driving force which is derived from a setting motor and which is applied to the spindle of a mechanism to be controlled, such as a linear setting drive.

In electric and electronic control systems frequently a setting motor is required which converts an electric information with high precision to a mechanical motion. Such motors conventionally have a small torque which in most cases is smaller than the torque requirement of the device to be controlled. To obtain such a required torque, it is known to interpose a linear or rotary power amplifier between the setting motor and the device to be controlled.

A linear power amplifier generally comprises a control valve which serves for the control of the flow of hydraulic fluid which effects an amplification of the torque of the setting motor by means of a fluidic pressure, as well as a threaded spindle with a spindle nut threadedly mounted thereon, whose position on the spindle is to be varied. A rotary power amplifier is in principle of similar construction except that instead of a spindle-and-nut assembly a simple driven shaft is used.

SUMMARY OF THE INVENTION

It is an object of the invention to provide an improved fluidic power amplifier of the above-outlined type in which the position of the spindle nut or the drive shaft is varied by fluidic control.

This object and others to become apparent as the specification progresses, are accomplished by the invention, according to which, briefly stated, the fluidic power-assisted setting device has a setting motor having an output torque; a threaded spindle supported for rotation; a spindle nut threadedly mounted on the spindle for linear displacement; a setting member attached to the spindle nut for linear travel therewith; a gearing for transmitting the output torque of the setting motor to the spindle; a signalling device coupled to the gearing for generating an output signal when the linear force derived from the output torque of the setting motor is insufficient to overcome an external force opposing linear displacement of the setting member; and a fluidic power device including a hydraulic motor connected to the setting member for applying thereto a linear force to overcome the external force; and a hydraulic control valve hydraulically connecting the hydraulic motor with pressurized hydraulic fluid as a function of the output signal of the signalling device for causing the hydraulic motor to generate a force applied to the setting member for overcoming the external force opposing the setting member.

BRIEF DESCRIPTION OF THE DRAWING

FIG. 1 is a sectional side elevational view of a preferred embodiment of the invention.

FIG. 2 is a schematic sectional end elevational view taken along line II—II of FIG. 1.

FIG. 3 is a fragmentary sectional side elevational view of a further preferred embodiment of the invention.

FIG. 4 is a schematic sectional end elevational view taken along line IV—IV of FIG. 3.

FIG. 5 is a fragmentary side elevational view of still another preferred embodiment of the invention.

DESCRIPTION OF THE PREFERRED EMBODIMENTS

Turning to FIG. 1, a stepping motor 1 shown therein has an output shaft 2 to which there is keyed a first spur gear 3. In a hydraulic cylinder 10 which has opposite radial end walls 11 and 12, there is situated a hollow cylindrical push rod 20 (setting member) which centrally passes through the end wall 11 and whose end 21 within the cylinder 10 is fitted into a spindle nut 22, constituting a piston component. The spindle nut 22 is peripherally provided with a piston ring 23 which sealingly and axially slidably engages the inner face of the cylinder 10. The spindle nut 22 may be exposed to fluid pressure on opposite sides and thus functions as a double-acting piston. Thus, the hydraulic cylinder 10 and the piston (spindle nut) 22 constitute a linearly acting hydraulic motor.

A threaded spindle 24, on which the spindle nut 22 is threadedly mounted, is situated in a coaxial orientation within the cylinder 10 and is held for rotation and limited axial displacement in the end wall 12. The spindle support device held in the end wall 12 is of conventional bearing construction, including seals, not shown. The spindle 24 has an axial stub shaft 25 (spindle input shaft) which projects outwardly from the end wall 12 and carries a second spur gear 26 keyed thereto.

Also referring to FIG. 2, between the first spur gear 3 and the second spur gear 26 there is positioned a third spur gear 30 which is, with its rotary shaft 38, rotatably supported in a linearly displaceable carrier 31 in such a manner that in case of unlike rotary displacement angles of the two identical spur gears 3 and 26, the third spur gear 30 travels along the periphery of the spur gears 3 and 26 parallel to the plane of FIG. 2, displacing the carrier 31 in its length dimension. The latter is connected with a control valve 32 at one end and with a spring assembly 33 at the other end. The spring assembly 33 which determines a central (zero) position of the carrier 31 and the spur gear 30, comprises a housing 34, a disc 35 which is rigidly affixed to the carrier 31 and two helical springs 36, 37 located on either side of the disc 35 and serving for centering the same. The spring assembly 33 also serves as a vibration damper of the carrier-and-valve system. It will be understood that other known damping system may be used instead of the described spring assembly.

Upon receiving a setting signal, the motor 1 rotates, turning the spindle 24 with the intermediary of spur gears 3, 30 and 26. The rotation of the spindle 24 causes the spindle nut (piston) 22 and the setting rod 20 attached thereto to travel axially. If the setting rod 20 is not capable of overcoming the external resisting force applied to the setting rod 20, because the axial force applied to the setting rod and derived solely from the torque of the motor 1 is too small, the third spur gear 30 rollingly shifts from its shown position as soon as the torque of the motor 1 applied to the spur gear 30 exceeds the biasing force of the springs 36 and 37 and thus the carrier 31 is caused execute an excursion. By virtue of such a motion of the carrier 31, the control lands in the control valve 32 are shifted and from the pressure reservoir T hydraulic fluid is directed through one of the two valve ports C1 or C2 to the corresponding nipple C3 or C4 provided in the cylinder 10. Hydraulic fluid is returned through the respective other nipple C4 or C3 in the cylinder 10 and the port C2 or C3 in the valve 32 to the exhaust port R of the control valve 32.

The charging of the appropriate side of the piston 22 with hydraulic fluid under pressure exerts an axial force on the piston 22 displacing it axially together with the push rod 20 and the spindle 24. Thus, in this manner the axial force derived from the setting motor 1 is supplemented such as to be sufficient to overcome the external force resisting the setting motion of the tubular setting rod 20.

Turning now to a second preferred embodiment illustrated in FIGS. 3 and 4, a first spur gear 40 is keyed to an output shaft 2' which is transversely displaceably connected to the output shaft 2 by a coupling 41. The second spur gear 26 is, similarly to the previously described embodiment, keyed to the stub shaft 25 constituting an extension of the spindle 24 and meshes with the first spur gear 40.

Both gears 26 and 40 are accommodated in a forked carrier 42, and the stub shaft 25 simultaneously serves as a pivotal support for the carrier 42 which is thus floatingly positioned. A terminal lug portion 43 of the carrier 42 thus moves in a direction parallel to the drawing plane of FIG. 4 if a force resists the motion of the setting rod 20 which is greater than that which can be applied by the setting motor 1. As shown in FIG. 4, such a displacement, similarly to the earlier-described embodiment, is transmitted to the control valve 32 via a setting bar 44 which is centered and dampened by the spring arrangement 33.

Turning now to FIG. 5, there is illustrated a third preferred embodiment of the invention. Instead of the cylinder 10 and a piston-like spindle nut, a rotary fluid motor 50 is provided which is arranged to apply a torque to the spindle 24 and whose ports C5, C6 are connected with the ports C1, C2 of the control valve 32 not shown in FIG. 5. Thus, the spindle 24 may be rotated with the force of the rotary fluid motor 50. For the controlled actuation of the control valve 32 an arrangement with the three spur gears as in the first embodiment may be used. In order to adapt the usually high rpm of the fluid motor 50 to the rpm of the setting motor 1, a known stepdown gear 51 is provided.

The present disclosure relates to subject matter contained in Swiss patent application No. 5109/85 (filed Nov. 29th, 1985) which is incorporated herein by reference.

It will be understood that the above description of the present invention is susceptible to various modifications, changes and adaptations, and the same are intended to be comprehended within the meaning and range of equivalents of the appended claims.

What is claimed is:

1. A fluidic power-assisted setting device comprising
   (a) a setting motor having an output shaft for transmitting a torque of said setting motor;
   (b) a threaded spindle supported for rotation;
   (c) a spindle nut threadedly mounted on said spindle and being arranged for linear displacement by said spindle relative thereto upon rotation thereof;
   (d) a setting member attached to said spindle nut for linear travel therewith; a displacement of said setting member being opposable by an external force;
   (e) gearing means for transmitting the output torque of said setting motor to said spindle; said gearing means including
      (1) a first spur gear mounted on said output shaft of said setting motor;
      (2) a second spur gear operatively connected to said spindle; and
      (3) a third spur gear arranged between and meshing with said first and second spur gears; said third spur gear having a rotary shaft and an axis of rotation;
   (f) signalling means coupled to said gearing means for generating an output signal when the linear force derived from the output torque of said setting motor is insufficient to overcome the external force opposing linear displacement of said setting member; said signalling means comprising a carrier supporting said rotary shaft of said third spur gear and being arranged for displacement in a direction generally perpendicular to the axis of rotation of said third spur gear when said third spur gear travels circumferentially relative to said first and second spur gears; said displacement of said carrier constituting said output signal;
   (g) a fluidic power means including
      (1) a source containing hydraulic fluid under pressure;
      (2) a hydraulic motor operatively connected to said setting member for applying thereto a linear force which, in combination with a linear force derived from the output torque of said setting motor is sufficient to overcome said external force opposing said setting member; and
      (3) a hydraulic control valve means operatively connected to said carrier for being operated by said carrier as a function of the displacement of said carrier; said hydraulic control valve means being further operatively connected to said source and said hydraulic motor for establishing and maintaining hydraulic communication between said source and said hydraulic motor as a function of said displacement of said carrier for causing said hydraulic motor to generate a force applied at least indirectly to said setting member as said linear force for overcoming the external force opposing said setting member.

2. A fluidic power-assisted setting device as defined in claim 1, wherein said hydraulic motor comprises a hydraulic cylinder and a double-acting piston accommodated in said hydraulic cylinder for sliding motion therein; said spindle being arranged within said hydraulic cylinder generally coaxially therewith; said spindle nut constituting said double-acting piston.

3. A fluidic power-assisted setting device as defined in claim 2, wherein said setting member comprises a tubular setting rod coaxially surrounding said spindle and having first and second ends; the first end being affixed to said double-acting piston and the second end projecting axially beyond said hydraulic cylinder.

4. A fluidic power-assisted setting device as defined in claim 1, further comprising a spring means operatively connected to said carrier for urging said carrier and said third gear into a determined position.

5. A fluidic power-assisted setting device as defined in claim 1, wherein said output shaft of said setting motor is a first output shaft; and further wherein said hydraulic motor is a rotary fluid motor having a second output shaft connected to said spindle for applying an output torque of said rotary fluid motor to said spindle.

6. A fluidic power-assisted setting device as defined in claim 5, further wherein said first gear is mounted on said first output shaft and said second gear is mounted on said second output shaft.

7. A fluidic power-assisted setting device as defined in claim 6, further comprising a spring means operatively connected to said carrier for urging said carrier and said third gear into a determined position.

8. A fluidic power-assisted setting device as defined in claim 5, further comprising a step-down gear operatively connected between said rotary fluid motor and said second output shaft.

* * * * *